(12) United States Patent
Lin et al.

(10) Patent No.: US 12,539,873 B2
(45) Date of Patent: Feb. 3, 2026

(54) DETECTION SYSTEM

(71) Applicant: InnoLux Corporation, Miao-Li County (TW)

(72) Inventors: Chao-Yin Lin, Miao-Li County (TW); I-An Yao, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 104 days.

(21) Appl. No.: 18/431,209

(22) Filed: Feb. 2, 2024

(65) Prior Publication Data

US 2024/0294182 A1    Sep. 5, 2024

Related U.S. Application Data

(60) Provisional application No. 63/449,807, filed on Mar. 3, 2023.

(30) Foreign Application Priority Data

Nov. 15, 2023   (CN) .......................... 202311520558.8

(51) Int. Cl.
    *B60W 50/14*    (2020.01)
(52) U.S. Cl.
    CPC ....... *B60W 50/14* (2013.01); *B60W 2050/143* (2013.01); *B60W 2050/146* (2013.01); *B60W 2422/00* (2013.01)
(58) Field of Classification Search
    CPC ........... B60W 50/14; B60W 2050/143; B60W 2050/146; B60W 2422/00; G08G 1/00; G08G 21/00; B60Q 9/00; B60Q 9/002; B60Q 9/008

USPC .......................................................... 701/36
See application file for complete search history.

(56) References Cited

U.S. PATENT DOCUMENTS

| | | | | |
|---|---|---|---|---|
| 6,345,839 | B1 * | 2/2002 | Kuboki ................ | B60N 2/003 73/862.632 |
| 6,517,106 | B1 * | 2/2003 | Stanley ................ | B60N 2/0026 280/735 |
| 6,559,555 | B1 * | 5/2003 | Saitou ................. | B60N 2/0035 307/121 |
| 11,726,651 | B2 * | 8/2023 | Shank ................... | B60K 35/10 715/810 |

(Continued)

FOREIGN PATENT DOCUMENTS

| | | | |
|---|---|---|---|
| CN | 105427529 B | 6/2018 | |
| CN | 114846773 A | 8/2022 | |
| WO | WO-2020165908 A2 * | 8/2020 | .......... G06V 20/593 |

*Primary Examiner* — Tuan C To
(74) *Attorney, Agent, or Firm* — MUNCY, GEISSLER, OLDS & LOWE, P.C.

(57) ABSTRACT

A detection system includes at least one sensor and a processor. The at least one sensor is disposed in a vehicle. When the vehicle is in a first state, the at least one sensor obtains a first sensing data. When the vehicle is in a second state, the at least one sensor obtains a second sensing data. The processor executes a processing procedure according to at least an instruction, wherein the processing procedure includes the steps of: receiving the first sensing data and the second sensing data, comparing the first sensing data with the second sensing data, and determining whether there is at least one detection object in the vehicle according to a comparison result of the first sensing data and the second sensing data.

19 Claims, 10 Drawing Sheets

(56) References Cited

U.S. PATENT DOCUMENTS

2009/0234542 A1\* 9/2009 Orlewski .......... B60R 21/01546
 701/45
2018/0065504 A1\* 3/2018 Lan ....................... B60W 10/30
2022/0114817 A1\* 4/2022 Gronau .................. G06V 40/10

\* cited by examiner

DETECTION SYSTEM

CROSS-REFERENCE TO RELATED APPLICATIONS

This application claims the benefit of filing date of U.S. Provisional Application Ser. No. 63/449,807 filed Mar. 3, 2023 under 35 USC § 119(e)(1), and also claims the benefit of the Chinese Patent Application Serial Number 202311520558.8, filed on Nov. 15, 2023, the subject matter of which is incorporated herein by reference.

BACKGROUND

Field of the Disclosure

The present disclosure relates to a detection system and, more particularly, to a detection system for vehicles.

Description of Related Art

Vehicles (such as but not limited to cars, etc.) have been widely used as means of transportation for families. However, due to negligence, it sometimes happens that parents forget their children or pets in the car when they leave the car, resulting in infants, young children or pets with insufficient abilities being trapped in the car and causing an accident.

Therefore, there is an urgent need to provide a detection system to alleviate and/or obviate the above problems.

SUMMARY

The present disclosure provides a detection system, which comprises: at least one sensor disposed inside a vehicle, wherein the at least one sensor obtains a first sensing data when the vehicle presents a first state, and the at least one sensor obtains a second sensing data when the vehicle presents a second state; and a processor executing a processing procedure according to at least one instruction, wherein the processing procedure includes the steps of: obtaining the first sensing data and the second sensing data; comparing the first sensing data and the second sensing data; and determining whether there is at least one detection target inside the vehicle according to a comparison result of the first sensing data and the second sensing data.

Other novel features of the disclosure will become more apparent from the following detailed description when taken in conjunction with the accompanying drawings.

DETAILED DESCRIPTION OF EMBODIMENT

Figure 1:
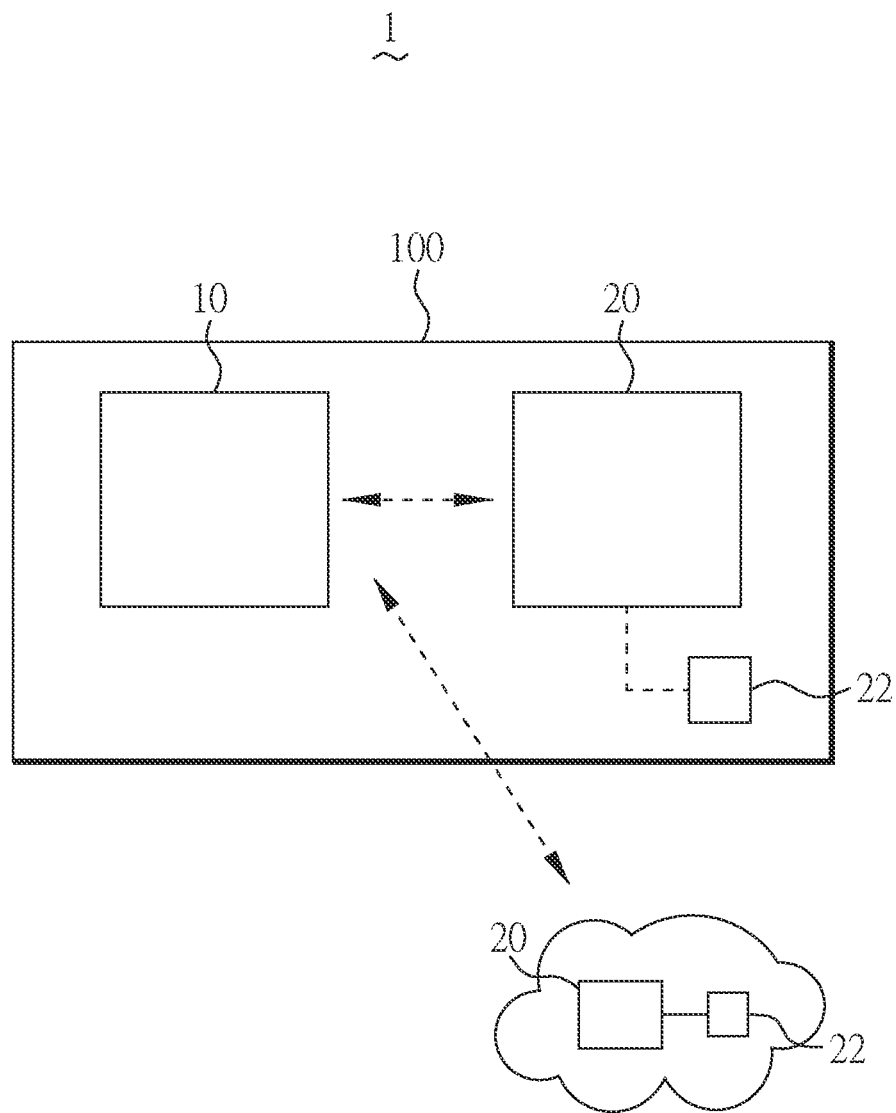
FIG. 1 is a schematic diagram illustrating the system architecture of the detection system according to an embodiment of the present disclosure.

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as "comprising", "containing" and "having" are open-ended words, and should be interpreted as meaning "including but not limited to".

The terms, such as "about", "substantially", or "approximately", are generally interpreted as within 10% of a given value or range, or as within 5%, 3%, 2%, 1%, or 0.5% of a given value or range.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims.

In the present disclosure, the term "a given range is from a first value to a second value" or "a given range is within a range from the first value to the second value" means that the given range includes the first value, the second value and other values therebetween.

In addition, the control method disclosed in the present disclosure may be used on electronic devices or vehicles equipped with electronic devices, wherein the electronic devices may include vehicle devices, imaging devices, assembly devices, backlight devices, antenna devices, tiled devices, touch electronic devices (touch display), curved electronic devices (curved display) or non-rectangular electronic devices (free shape display), but not limited thereto. The electronic device may include, for example, liquid crystal, light emitting diode, fluorescence, phosphor, other suitable display media, or a combination thereof, but not limited thereto. The display device may be a non-self-luminous display device or a self-luminous display device. The antenna device may be a liquid crystal type antenna device or a non-liquid crystal type antenna device, and the sensing device may be a sensing device that senses capacitance, light, heat energy or ultrasonic waves, but not limited thereto. The tiled device may include, for example, a display tiled device or an antenna tiled device, but not limited thereto. It is noted that the electronic device may be any combination of the above, but not limited thereto. In addition, the electronic device may be a bendable or flexible electronic device. It is noted that the electronic device may be any combination of the above, but not limited thereto. In addition, the shape of the electronic device may be a rectangular shape, a circular shape, a polygonal shape, a shape with curved edges, or other suitable shapes. The electronic device may have peripheral systems such as a driving system, a control system, a light source system, a shelf system, etc. to support the display device, antenna device or tiled device.

It is noted that the following are exemplary embodiments of the present disclosure, but the present disclosure is not limited thereto, while a feature of some embodiments can be applied to other embodiments through suitable modification, substitution, combination, or separation. In addition, the present disclosure can be combined with other known structures to form further embodiments.

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way. Unless there is a special definition in the embodiment of the present disclosure.

In addition, the word "adjacent" in the specification and claims, for example, is used to describe mutual proximity and does not necessarily mean that they are in contact with each other.

In addition, descriptions such as "when . . . " or "while" in the present disclosure refer to aspects such as "at the moment, before or after", but not limited to situations that occur at the same time. Similar descriptions such as "disposed on" in the present disclosure indicate the corresponding positional relationship between two components, but not limited to whether there is contact between the two components, unless otherwise specified. Furthermore, when multiple effects are provided in the present disclosure, if the word "or" is used between the effects, it means that the effects may exist independently, but it does not exclude that multiple effects may exist at the same time.

The detection system of the present disclosure may be used for vehicles. The types of vehicles may, for example, include buses, self-driving cars, taxis, mass rapid transits, high-speed rails, trains, subways, airplanes or ships, etc., while it is not limited thereto. For convenience of explanation, the vehicle is exemplified by a car in the following description.

In the present disclosure, unless otherwise specified, the inside of the vehicle refers to the available area in the vehicle, such as the seat area, cabin space, etc., while it is not limited thereto.

FIG. 1 is a schematic diagram illustrating the system architecture of the detection system 1 according to an embodiment of the present disclosure, which presents the system architecture of the detection system 1 in the form of a block diagram. As shown in FIG. 1, the detection system 1 includes at least one sensor 10 and a processor 20, wherein the at least one sensor 10 may be disposed inside a vehicle 100, the processor 20 may be disposed inside or outside the vehicle 100, and wired communication or wireless communication may be performed between the at least one sensor 10 and the processor 20, while it is not limited thereto.

When the vehicle 100 presents a first state, the at least one sensor 10 may detect the inside of the vehicle 100 to obtain a first sensing data. When the vehicle 100 presents a second state, the at least one sensor 10 may detect the inside of the vehicle 100 again to obtain a second sensing data. The processor 20 may execute a processing procedure according to at least one instruction 22, wherein the processing procedure includes the steps of: obtaining the first sensing data and the second sensing data; comparing the first sensing data and the second sensing data; and determining whether there is at least one detection target inside the vehicle 100 according to the comparison result of the first sensing data and the second sensing data. In one embodiment, the detection target may include a living body or a specific object, wherein the specific object is, for example, an object that requires temperature monitoring, but it is not limited thereto. For the convenience of explanation, a living body is mainly taken as an illustration example for the detection target in the following.

As a result, the detection system 1 may detect the inside of the vehicle 100 through the sensor 10, and determine whether there is at least one detection target inside the vehicle 100 through the processor 20. Therefore, if a detection target is trapped in the vehicle 100, the detection system 1 may detect the existence of the detection target, and then may perform subsequent processing, such as assisting in asking for external help, while it is not limited thereto.

Some components of the detection system 1 are described here.

First, the sensor 10 will be described. In one embodiment, the type of the sensor 10 may include, for example, an infrared sensor, a visible light sensor, an optical sensor or a temperature sensor, or any combination of the above, while it is not limited thereto. In one embodiment, the sensor 10 may be used to detect the condition of the seat of the vehicle 100; for example, when the sensor 10 is an infrared sensor, a visible light sensor or an optical sensor, the sensing data detected by the sensor 10 includes, for example, image data at the seat, where the image data may include a single image (such as but not limited to a picture) or a continuous image (such as but not limited to a video). When the sensor 10 is a temperature sensor, the sensing data detected by the sensor 10 includes, for example, data of the temperature distribution in the detection area, while it is not limited thereto. In one embodiment, when the sensor 10 is an infrared sensor, the image data detected by the sensor 100 may be used to display the heat source contour of the detection target. With the image data detected by the infrared sensor, it only displays the contour of the heat source and does not display the complete true color image, so that the privacy issues that may be involved in subsequent processing of image data can be reduced, while it is not limited thereto. In one embodiment, the sensor 10 may be electrically connected to a control system of the vehicle 100 (such as but not limited to a vehicle-mounted host) for performing signal transmission or data transmission, while it is not limited thereto.

In one embodiment, the sensor 10 may have a horizontal field of view (field of view-horizontal, (fov(H)), wherein the fov(H) may be defined as the sensing range of the sensor 10 on a horizontal plane, where the horizontal plane may be, for example, substantially parallel to the ground on which the vehicle 100 is mounted, while it is not limited thereto. In one embodiment, the fov(H) may be between 140 degrees and 180 degrees (140 degrees≤fov(H)≤180 degrees), while it is not limited thereto. In one embodiment, the fov(H) may be between 150 degrees and 170 degrees (150 degrees≤fov(H) ≤170 degrees), while it is not limited thereto. In one embodiment, the fov(H) may be between 155 degrees and 165 degrees (155 degrees≤fov(H)≤165 degrees), while it is not limited thereto. In addition, in one embodiment, the sensor 10 may have a vertical field of view (field of view-vertical, fov(V)), where the fov(V) may be defined as the sensing range of the sensor 10 on a vertical plane, wherein the vertical plane is substantially perpendicular to the horizontal plane, while it is not limited thereto. In one embodiment, the fov(V) may be between 80 degrees and 120 degrees (80 degrees≤fov(H)≤120 degrees), while it is not limited thereto. In one embodiment, the fov(V) may be between 90 degrees and 110 degrees (90 degrees≤ fov(H)≤110 degrees), while it is not limited thereto. In one embodiment, the fov(V) may be between 95 degrees and 105 degrees (95 degrees≤fov(H) ≤105 degrees), while it is not limited thereto.

Regarding the arrangement of the sensor 10 (such as the installation position in the vehicle 100, etc.), it will be described with reference to FIGS. 2A to 2E in the following paragraphs.

Next, the processor 20 will be described. The processor 20 may be used to analyze the sensing data obtained by the sensor 10, while it is not limited thereto. In one embodiment, the processor 20 may be disposed in the control system of the vehicle 100. For example, when the vehicle 100 is a car, the processor 20 may be disposed in the vehicle-mounted host of the vehicle 100, while it is not limited thereto. In another embodiment, the processor 20 may be disposed outside the vehicle 100, for example, disposed in a cloud server, and may perform data transmission with the sensor 10 and the control system (such as but not limited to vehicle-mounted host) of the vehicle 100 through wireless communication, while it is not limited thereto. In one embodiment, the processor 20 may execute at least one instruction 22. When the processor 20 executes the instruction 22, the processor 20 may perform special operations, such as executing a processing procedure and a first advanced monitoring procedure (shown in FIG. 4) and/or a second advanced monitoring program (shown in FIG. 6). In one embodiment, the type of the processor 20 may, for example, include a physical processor that may execute software or firmware, but may also include a virtual processor in the form of software, while it is not limited thereto. In one embodiment, the instruction 22 may be stored in a non-transitory computer-readable medium, wherein the "non-transitory computer-readable medium" may include, for example, a memory, a hard disk, a flash drive, a virtual memory, a cloud drive or other devices with similar functions, while it is not limited thereto. In one embodiment, the non-transitory computer-readable medium storing instructions 22 may be disposed in the vehicle 100. For example, the non-transitory computer-readable medium may be the memory or hard disk of the control system (such as but not limited to the vehicle-mounted host) of the vehicle 100, while it is not limited thereto. In one embodiment, the non-transitory computer-readable medium storing instructions 22 may be disposed outside the vehicle 100. For example, the non-transitory computer-readable medium may be the memory or hard disk of a cloud server, while it is not limited thereto. In addition, in one embodiment, the instruction 22 may be in the form of software or firmware, for example, but it is not limited thereto.

The arrangement of the sensor 10 in the vehicle 100 may affect the performance of the detection system 1, such as the accuracy of detection and analysis. Therefore, the arrangement of the sensor 10 will be described by an example in the following.

FIGS. 2A to 2E are schematic diagrams each illustrating the arrangement of the sensor according to an embodiment of the present disclosure, which are used to present possible arrangements of the sensor 10 in the vehicle 100. It is noted that FIG. 2A to FIG. 2E are only examples, while the present disclosure is not limited thereto.

Figure 2A:
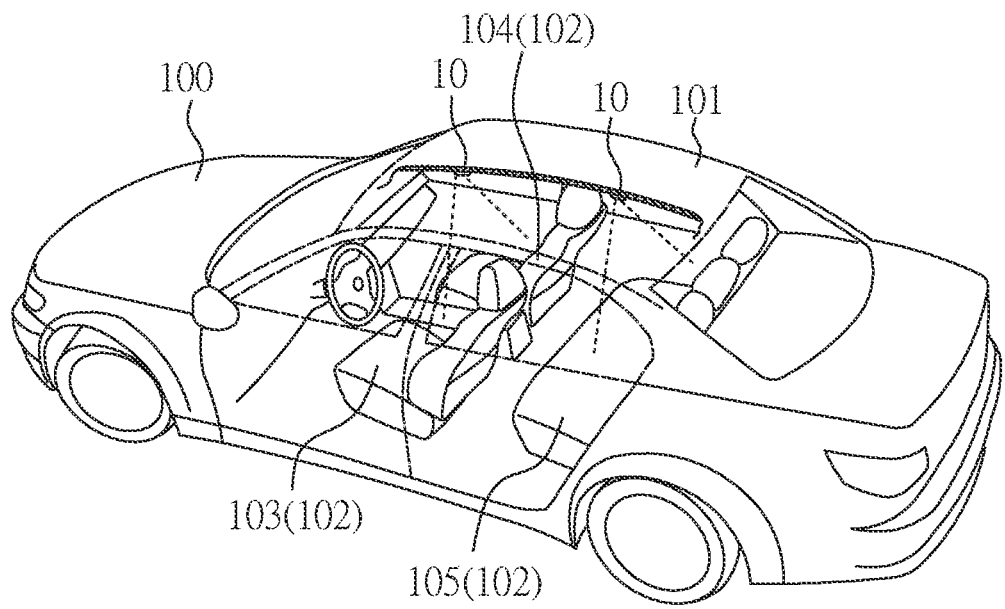
FIG. 2A is a schematic diagram illustrating the arrangement of the sensor according to an embodiment of the present disclosure.

In the embodiment of FIG. 2A, the sensors 10 may be disposed on the roof 101 of the vehicle 100, and the sensing range of the sensor 10 may include the area of the seat 102 of the vehicle 100. For example, the roof 101 of the vehicle 100 may be provided with multiple sensors 10, and the seats 102 of the vehicle 100 may include a driver seat 103, a passenger seat 104 and at least one rear seat area 105, wherein the sensing direction of at least a portion of the sensors 10 may be at least partially directed to the driver seat 103 and/or the passenger seat 104 for detecting the conditions of the driver seat 103 and/or the passenger seat 104, while the sensing direction of at least another portion of the sensors 10 may be at least partially directed to the rear seat area 105 for detecting the condition of the rear seat area 105, while it is not limited thereto.

Figure 2B:
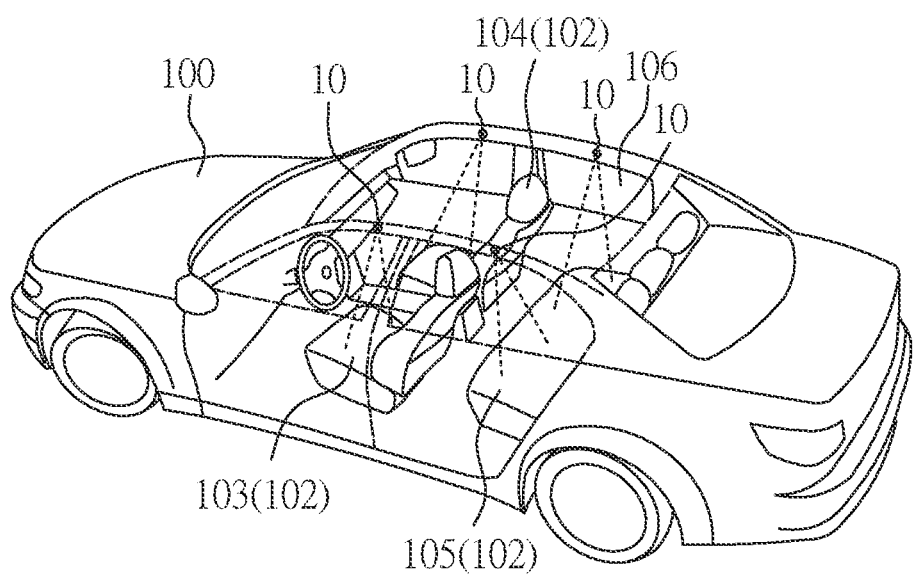
FIG. 2B is a schematic diagram illustrating the arrangement of the sensor according to an embodiment of the present disclosure.

In the embodiment of FIG. 2B, the sensors 10 may be disposed near the window 106 of the vehicle 100, and the sensing range of the sensor 10 may include the area of the seats 102 of the vehicle 100. For example, multiple sensors 10 may be disposed above the window 106 of the vehicle 100, and the sensing direction of at least a portion of the sensors 10 may be at least partially directed to the driver seat 103 and/or the passenger seat 104, while the sensing direction of at least another portion of the sensors 10 may be at least partially directed to the rear seat area 105 for detection, while it is not limited thereto.

Figure 2C:
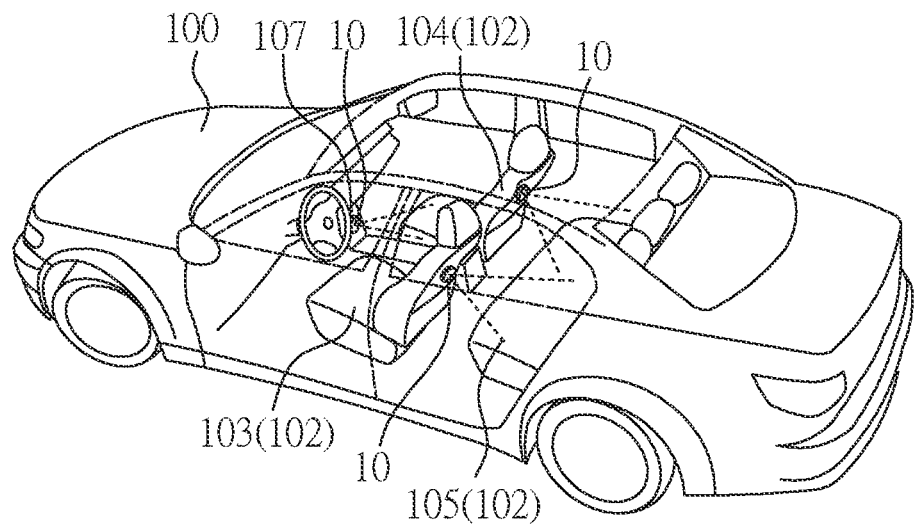
FIG. 2C is a schematic diagram illustrating the arrangement of the sensor according to an embodiment of the present disclosure.

In the embodiment of FIG. 2C, the sensors 10 may be disposed on the seats 102 of the vehicle 100 (such as the driver seat 103 and/or the passenger seat 104) and/or a center console 107, wherein the sensing direction of at least a portion of the sensors 10 may be at least partially directed to the driver seat 103 and/or the passenger seat 104, and the sensing direction of at least another portion of the sensors 10 may be at least partially directed to the rear seat area 105 for detection. For example, at least a portion of the sensors 10 may be disposed on the back of the driver seat 103 and/or the passenger seat 104 for detecting the condition of the rear seat area 105, while at least another portion of the sensors 10 may be disposed on the center console 107 to detect the state of the driver seat 103 and/or the passenger seat 104, while it is not limited thereto.

Figure 2D:
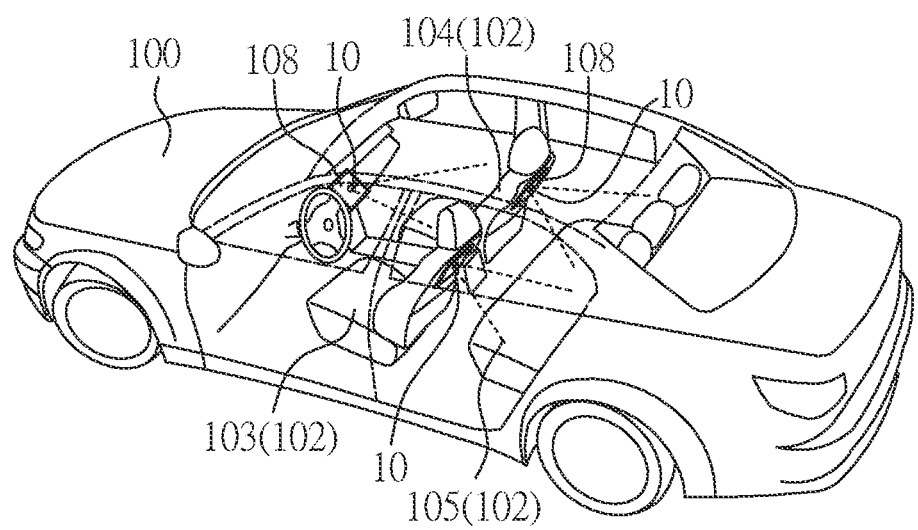
FIG. 2D is a schematic diagram illustrating the arrangement of the sensor according to an embodiment of the present disclosure.

In the embodiment of FIG. 2D, one or multiple display devices 108 may be disposed inside the vehicle 100, and the sensors 10 may be integrated into the display devices 108, wherein the sensing direction of at least a portion of the sensors 10 may be at least partially directed to the driver seat 103 and/or the passenger seat 104, and the sensing direction of at least another portion of the sensors 10 may be at least partially directed to the rear seat area 105 for detection, while it is not limited thereto.

Figure 2E:
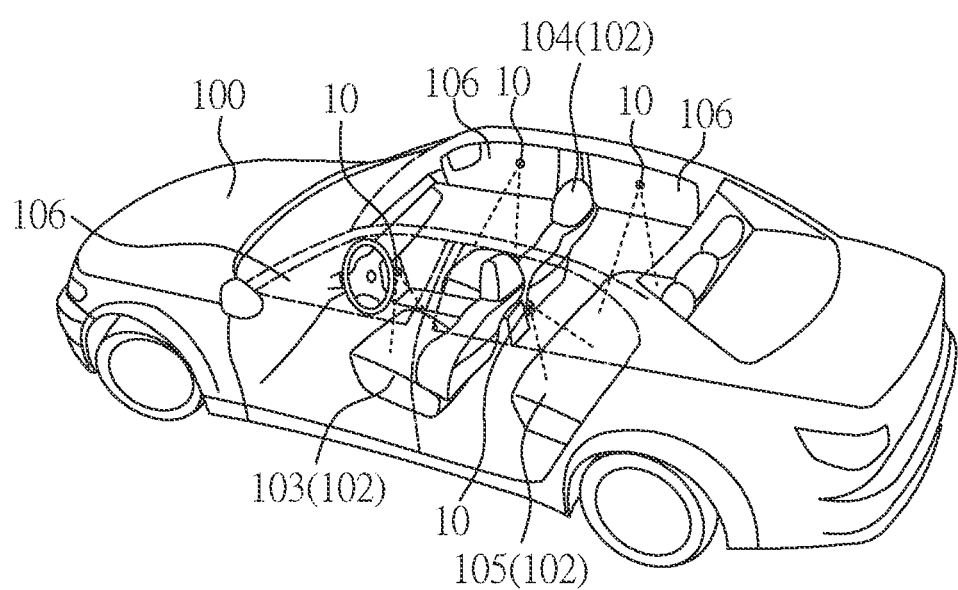
FIG. 2E is a schematic diagram illustrating the arrangement of the sensor according to an embodiment of the present disclosure.

In the embodiment of FIG. 2E, the sensors 10 may be integrated into the windows 106 (or windshield, not shown) of the vehicle 100. At this moment, the sensing range of the sensors 10 may include the area of the seats 102 of the vehicle 100. For example, the window 106 (or windshield, not shown) may be a transparent display, such that the sensor 10 may be integrated into the transparent display, while it is not limited thereto.

The arrangement of the sensors 10 in FIGS. 2A to 2E is only an example but not a limitation. The present arrangement may also have other arrangements. In addition, as long as it is reasonable and achievable, the implementation aspects of FIG. 2A to FIG. 2E may be arbitrarily combined and matched according to the requirements.

Figure 3:
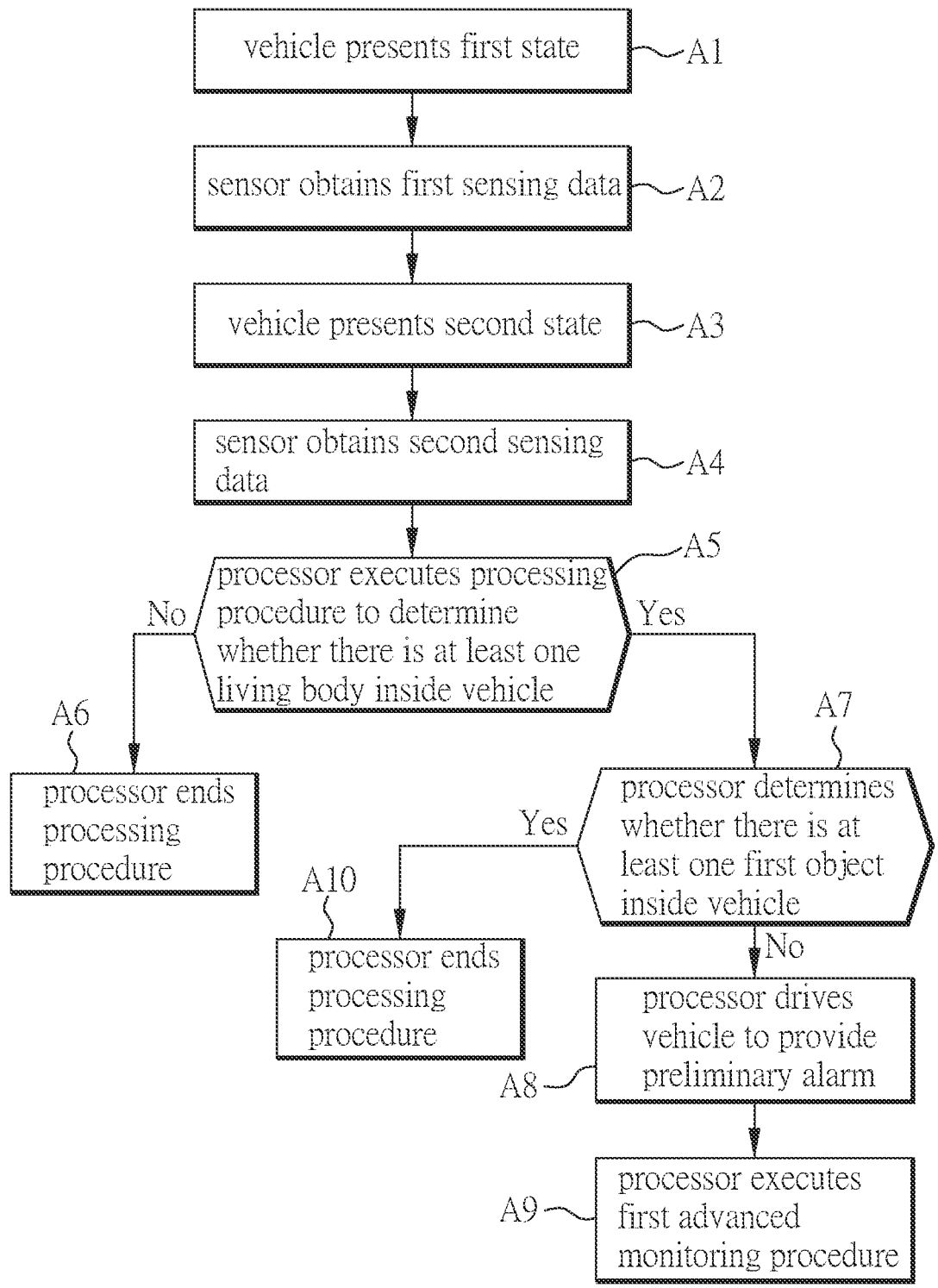
FIG. 3 is an operation flow chart of the detection system according to the first embodiment of the present disclosure.

Next, the operation of the detection system 1 will be described. FIG. 3 is an operation flow chart of the detection system 1 according to the first embodiment of the present disclosure, and please refer to FIGS. 1 to 2E at the same time.

As shown in FIG. 3, step A1 is executed first, in which the vehicle 100 presents the first state. Then, step A2 is executed, in which the sensor 10 obtains the first sensing data. Then, step A3 is executed, in which the vehicle 100 presents the second state. Then, step A4 is executed, in which the sensor 10 obtains the second sensing data. Then, step A5 is executed, in which the processor 20 executes a processing procedure to determine whether there is at least one detection target inside the vehicle 100. When the processor 20 determines that there is no at least one detection target inside the vehicle 100, step A6 is executed, in which the processor 20 ends the processing procedure. When the processor 20 determines that there is at least one detection target inside the vehicle 100, step A7 is executed, in which the processor 20 determines whether there is at least one first object inside the vehicle 100. When the processor 20 determines that there is no at least one first object inside the vehicle 100, step A8 is executed, in which the processor 20 drives the vehicle 100 to provide a preliminary alarm. Then, step A9 is executed, in which the processor 20 executes a first advanced monitoring procedure. When the processor 20 determines that there is at least one first object inside the vehicle 100, step A10 is executed, in which the processor 20 ends the processing procedure.

Regarding step A1, in one embodiment, the first state of the vehicle 100 may include, for example, a state in which the operable components of the vehicle 100 are operated such as the door being opened, the window being opened, or the lights being turned on, while it is not limited thereto. For convenience of explanation, the door being opened is taken as an example in the following. In one embodiment, when the door of the vehicle 100 is opened, the control system (such as but not limited to a vehicle-mounted host) of the vehicle 100 may send an activation signal to the sensor 10 to activate the sensor 10 to perform the sensing operation. It is noted that the function of sensing whether the door is opened is already known in existing vehicles, and thus a detailed description is deemed unnecessary.

Regarding step A2, the sensor 10 may perform sensing according to the activation signal transmitted by the vehicle 100, so as to obtain the first sensing data. In one embodiment, the sensor 10 may obtain the sensing data of the front seats (the driver seat 103 and the passenger seat 104, shown in FIGS. 2A to 2E) and the rear seat area 105, and directly or indirectly transmit the sensing data to the processor 20. Alternatively, the sensing data may also be stored through various storage devices, such as a storage device in a vehicle host or a cloud server, while it is not limited thereto.

Regarding step A3, in one embodiment, the second state of the vehicle 100 may, for example, include a state in which the operation of the operable components of the vehicle has ended, such as the door being closed, the window being closed, or the lights being turned off, while it is not limited thereto. For convenience of explanation, the door being closed is taken as an example in the following. In one embodiment, when the door of the vehicle 100 returns from the opened state to the closed state, the control system (such as but not limited to the vehicle-mounted host) of the vehicle 100 may send the activation signal to the sensor 10 again to re-activate the sensor 10 for performing sensing operation.

Regarding step A4, the sensor 10 may perform sensing again according to the activation signal transmitted by the vehicle 100, so as to obtain the second sensing data. In one embodiment, the second sensing data obtained by the same sensor 10 may correspond to the first sensing data; for example, the two sensing data may correspond to the same sensing position, while it is not limited thereto.

Regarding step A5, the processor 20 may compare the first sensing data with the second sensing data, and determine whether there is a detection target in the car after the door is closed based on the comparison result. Since the opening and closing of the door usually indicates that someone enters or exits the vehicle 100 and dangerous events, such as children, pets, or objects under temperature monitoring left in the car, may occur when an adult leaves the vehicle 100, it is able to determine whether there are detection targets inside the vehicle 100 by comparing the sensing data when the door is opened and closed.

In one embodiment, when the sensor 10 is an infrared sensor, the first sensing data and the second sensing data may be, for example, infrared light images, and the processor 20 may identify the presence or absence of the detection target based on the shape or size of the edge of the heat source presented in the first sensing data and the second sensing data, and determine whether there is a detection target in the car after the door is closed based on the difference between the first sensing data and the second sensing data, while it is not limited thereto. In one embodiment, when the sensor 10 is a visible light sensor or other optical sensor, the first sensing data and the second sensing data may be, for example, visible light images or other optical images, and the processor 20 may compare the scenes and objects in the first sensing data and the second sensing data through various image recognition methods, and determine whether there is a detection target in the car based on the difference between the first sensing data and the second sensing data, while it is not limited thereto. In one embodiment, when the sensor 10 is a temperature sensor, the processor 20 may identify objects in the environment based on the temperature distribution in the first sensing data and the second sensing data, and determine whether the objects are detection targets in the environment based on the difference between the first sensing data and the second sensing data, while it is not limited thereto. In one embodiment, the vehicle 1 may be equipped with multiple types of sensors 10 at the same time, so that the processor 20 may obtain multiple types of first sensing data and second sensing data, and integrate different types of first sensing data and second sensing data to improve the accuracy of analysis.

In addition, in one embodiment, the processor 20 may also perform other analysis on the first sensing data or the second sensing data. In one embodiment, the processor 20 may further analyze the type of the detection target based on the identified shape or size of the detection target, for example, the detection target being a living body or object, or further analyze the detection target being a human or other animals, or the detection target being an adult, young child or elderly person, etc., while it is not limited thereto.

In one embodiment, the processor 20 may further analyze the number of detection targets in the vehicle 100, while it is not limited thereto. The above analysis by the processor 20 is only an example but not a limitation.

Regarding step A6, In one embodiment, when there is no detection target inside the vehicle 100, it indicates that all passengers, pets or objects that require temperature monitoring have left the vehicle 100, so that the possibility of encountering dangerous events is low. Therefore, the processor 20 may end the processing procedure, and the detection system 1 may temporarily stop operating, while it is not limited thereto.

Regarding step A7, in one embodiment, the type of the first object may be, for example, but not limited to, an adult. When there are adults inside the vehicle 100, the possibility of encountering dangerous events is usually low. Therefore, the processor 20 may identify whether the detection target is an adult based on the size or shape of the detection target, thereby determining whether there are adults inside the vehicle 100.

Regarding step A8, when there is no adult inside the vehicle 100, it indicates that the adult may have left the vehicle 100, so that the detection targets in the vehicle 100 may be children, pets, or objects that require temperature monitoring. At this moment, the vehicle 100 may provide a preliminary alarm to alert adults who may still be in the vicinity of the vehicle 100. In one embodiment, the preliminary alarm may include, for example, a voice message, a ring, a horn, or other audio-related prompts, while it is not limited thereto. In one embodiment, after the vehicle 100 provides the preliminary alarm for a period of time, such as several minutes, if the door has not been opened, it indicates that the possibility of encountering dangerous events has increased, and thus a further monitoring is required. Therefore, step A9 is executed, in which the processor 20 starts executing the first advanced monitoring procedure. In one embodiment, step A8 may be selectively executed or not executed. For example, when the processor 20 determines that there is no adult inside the vehicle 100, the processor 20 may skip step A8 and directly execute step A9, while it is not limited thereto. In addition, the details of step A9 (the first advanced monitoring procedure) will be explained in subsequent paragraphs with reference to FIG. 4.

Regarding step A10, when there are adults inside the vehicle 100, it indicates that the possibility of encountering dangerous events is low, so that the processor 20 may end the processing procedure, and the detection system 1 may temporarily stop operating, while it is not limited thereto.

Figure 4:
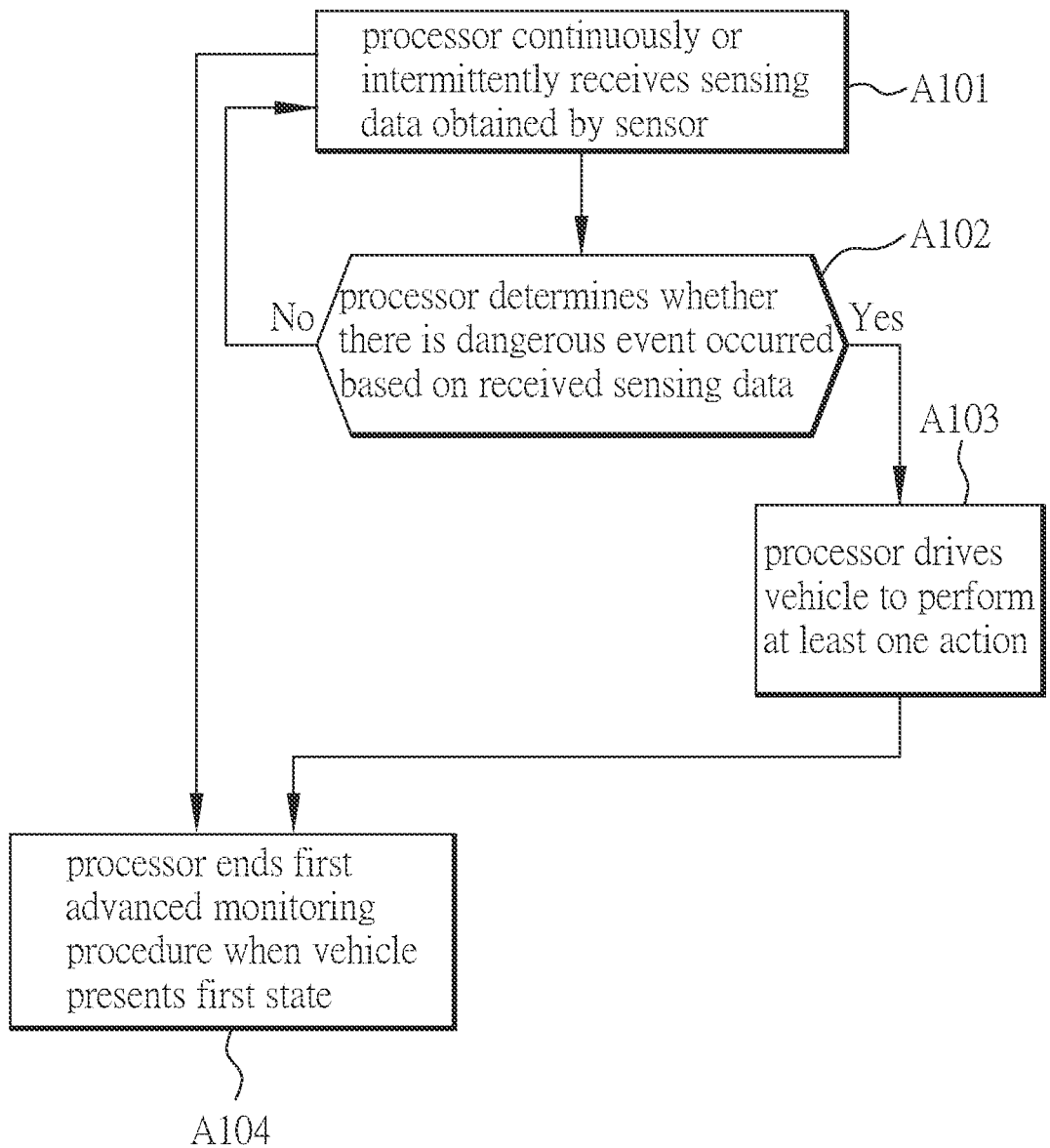
FIG. 4 is a flow chart illustrating the steps of the first advanced monitoring procedure according to an embodiment of the present disclosure.

Next, the first advanced monitoring procedure (step A9) will be described. FIG. 4 is a flow chart illustrating the steps of the first advanced monitoring procedure according to an embodiment of the present disclosure, and please refer to FIGS. 1 to 3 at the same time.

As shown in FIG. 4, step A101 is executed first, in which the processor 20 continuously or intermittently receives the sensing data obtained by the sensor 10. Then step A102 is executed, in which the processor 20 determines whether there is a dangerous event occurred based on the received sensing data. When the processor 20 determines that there is no dangerous event occurred, steps A101 and A102 are re-executed to continuously monitor the conditions in the vehicle. When the processor 20 determines that there is a dangerous event occurred, step A103 is executed, in which the processor 20 drives the vehicle 100 to perform at least one action. During the process of the first advanced monitoring procedure, when the vehicle 100 presents the first state again (for example, the door is opened), step A104 is executed, in which the processor 20 ends the first advanced monitoring procedure.

Regarding step A101, in one embodiment, during the process of the first advanced monitoring procedure, the sensor 10 continuously or intermittently obtains sensing data, and provides the obtained sensing data to the processor 20 for subsequent processing. In addition, in one embodiment, if the sensor 10 in the vehicle 100 has both a visible light sensor and other types of sensors, since the image data obtained by the visible light sensor usually has a higher resolution that requires more storage space, and the content of the image data may involve the privacy of the person being photographed, the detection system 1 may only activate the visible light sensor when the first advanced monitoring procedure starts to execute, so that the visible light sensor may be used as an assistance of other types of sensors 10 thereby reducing the use of storage space or reducing privacy issues, while it is not limited thereto.

Regarding step A102, it is noted that the "dangerous event" in the present disclosure does not mean that the danger will inevitably occur, but may mean that the possibility of encountering dangerous events is higher than a threshold, while it is not limited thereto. In one embodiment, the dangerous event may include: violent movement of at least one detection target in the vehicle 100, abnormal temperature or body temperature of at least one detection target, abnormal ambient temperature inside the vehicle 100, or at least one detection target being determined to be a second object (such as but not limited to infants, young children or pets with insufficient behavioral capabilities) and the time of all first objects (such as adults) leaving the vehicle exceeding a first time threshold, or any combination of the above conditions, while it is not limited thereto. In one embodiment, the processor 20 may intermittently determine whether there is a dangerous event occurred, for example, make one determination every time an interval passes. In one embodiment, the interval may be, for example, between 0 seconds and 5 minutes (0 seconds≤interval≤5 minutes). In one embodiment, the interval may be, for example, between 0 seconds and 1 minute (0 seconds≤interval≤1 minute). In one embodiment, the interval may be, for example, between 0 seconds and 30 seconds (0 seconds≤interval≤30 seconds). The above values of the interval are only examples, while the present disclosure is not limited thereto.

The implementation aspect of determination of dangerous events by the processor 20 is described as follows. In one embodiment, when the detection target undergoes violent movement, there is a high possibility that the detection target itself is in a dangerous situation, for example, a person trapped in a car is slamming the window, etc. Therefore, the situation that the detection target undergoes violent movement may be considered a dangerous event. In one embodiment, the processor 20 may determine whether there is an event that the detection target in the vehicle 100 undergoes a violent movement by comparing sensing data of continuous time, while it is not limited thereto.

In one embodiment, the abnormal temperature or body temperature of the detection target (such as but not limited to children having a fever or the temperature of objects in the car is too high) or the abnormal ambient temperature (such as but not limited to the temperature in the car being too high or too low) may cause danger, so that abnormal body temperature of the detection target or abnormal ambient temperature may be regarded as a dangerous event. In one embodiment, a temperature sensor may be disposed inside the vehicle 100, or the sensor 10 itself may have a temperature sensing function. Therefore, the processor 20 may obtain the temperature or body temperature of the detection target, or may obtain the ambient temperature inside the vehicle 100. In addition, the processor 20 may compare the temperature or body temperature of the detection target with a preset normal body temperature range to determine whether the temperature or body temperature of the detection target is abnormal, or the processor 20 may compare the ambient temperature inside the vehicle 100 with a preset normal ambient temperature range to determine whether the ambient temperature is abnormal, while it is not limited thereto.

In one embodiment, when all adults leave the vehicle 100 for a long time and there are babies, young children or pets inside the vehicle 100, it indicates that the babies, young children or pets may be forgotten by the adults. Therefore, the length of time that all adults leave the vehicle 100 may be used as an indicator of whether there is a dangerous event occurred. In one embodiment, when all adults leave the vehicle 100, the processor 20 may calculate the time elapsed after the adults leave the vehicle 100, and determine whether the elapsed time exceeds the first time threshold. In one embodiment, the first time threshold may be between 0.5 hours and 1.5 hours (0.5 hours≤first time threshold≤1.5 hours), while it is not limited thereto. In one embodiment, the first time threshold may be between 0.5 hours and 1 hour (0.5 hours≤first time threshold≤1 hour), while is not limited thereto. In one embodiment, the first time threshold may be between 15 hours and half an hour (15 hours≤first time threshold≤0.5 hours), while it is not limited thereto. The above first time thresholds are only examples, while the present disclosure is not limited thereto.

As a result, examples of dangerous events can be understood. It is noted that dangerous events are not limited to the above examples.

Regarding step A103, when the processor 20 determines that a dangerous event occurs, it indicates that the detection target in the vehicle 100 may require external assistance, so that the processor 20 may send a driving signal to the control system (such as but not limited to a vehicle-mounted host) of the vehicle 100, and thus the vehicle 100 performs at least one action through various feasible methods. In one embodiment, the actions of the vehicle 100 include: continuous monitoring of the conditions inside the vehicle, issuing advanced alarms, automatic control or asking for external help, or any combination of the above.

Regarding "continuous monitoring", in one embodiment, continuous monitoring may include regularly recording and analyzing the physiological condition of the detection target, the activities of the detection target, the body temperature of the detection target and the ambient temperature, while it is not limited thereto.

Regarding "issuing advanced alarms", in one embodiment, issuing advanced alarms may include providing a voice message to the inside of the vehicle 100. For example, when the inside of the vehicle 100 is provided with broadcast equipment (such as but not limited to stereo system, navigation, vehicle-mounted host, etc.), the broadcast device may play a voice message to the inside of the vehicle 100 so as to provide instructions or comfort the people in the vehicle 100, while it is not limited thereto. In one embodiment, issuing advanced alarms may include periodically broadcasting to the outside of the vehicle 100. For example, the vehicle 100 may periodically issue a horn sound to attract the attention of the people near the vehicle 100, thereby increasing the chance of finding a stranded person, while it is not limited thereto. The above implementation aspects are only examples, while the present disclosure is not limited thereto.

Regarding "automatic control", in one embodiment, automatic control may include automatically adjusting an air conditioning device of the vehicle 100 or automatically controlling a window device of the vehicle 100, or any combination of the above, while it is not limited thereto. For example, when the processor 20 determines that the ambient temperature inside the vehicle 100 is abnormal, it may drive the vehicle 100 to automatically adjust the air conditioning device or control the window device to adjust the ambient temperature inside the vehicle 100, while it is not limited thereto. The above implementation aspects are only examples, while the present disclosure is not limited thereto.

Regarding "asking for external help", in one embodiment, asking for external help may include periodically sending a notification message and/or an image message to a communication device outside the vehicle 100. For example, the mobile communication device of the first object (such as a driver or other adult) may be pre-registered in the control system (such as but not limited to a vehicle-mounted host) of the vehicle 100 so as to establish a communication link between the two and, when a dangerous event occurs, the control system (such as but not limited to the vehicle-mounted host) of the vehicle 100 may periodically transmit notification messages or image messages of vehicle conditions to the mobile communication device of the first object, so that the first object may control the conditions in the vehicle, while it is not limited thereto. In one embodiment, asking for external help may include sending distress messages and/or image messages to a rescue unit. For example, when a dangerous event occurs, the control system (such as but not limited to a vehicle-mounted host) of the vehicle 100 may be in network connection with the system host or website of the rescue unit to notify the occurrence of a dangerous event or provide images of the situation inside the vehicle to the rescue unit so that the rescue unit may control the situation in real time. In one embodiment, the rescue unit may include, for example, a police station, fire department, hospital, etc., while it is not limited thereto. In one embodiment, asking for external help may include making a phone call. For example, the control system (such as but not limited to a vehicle-mounted host) of the vehicle 100 may be preset with at least one set of emergency phone numbers and, when a dangerous event occurs, the set of emergency phone numbers may be automatically dialed and the trapped person may communicate with the owner of the emergency phone number, for example, a young child may communicate with his/her parents, while it is not limited thereto. In one embodiment, the vehicle 100 may also have a remote control function for allowing the driver to remotely control the vehicle 100 when realizing that a dangerous event occurs, such as remotely controlling the opening or closing of the door, while it is not limited thereto. In one embodiment, the above actions of asking for external help may also be applied to the field of anti-theft of vehicles, while it is not limited thereto. The above implementation aspects are only examples, while the present disclosure is not limited thereto.

As a result, the example of the action of the vehicle 100 can be understood. It is noted that the actions of the vehicle 100 are not limited thereto.

Regarding step A104, during the process of the first advanced monitoring procedure, when the door of the vehicle 100 is opened, it indicates that the possibility of the trapped person being rescued is greatly increased, and thus the first advanced monitoring procedure may be terminated, while the operation of the detection system 1 may be temporarily stopped, but it is not limited thereto.

As a result, the operation flow of the detection system 1 and the first advanced monitoring procedure of the first embodiment can be understood.

Figure 5:
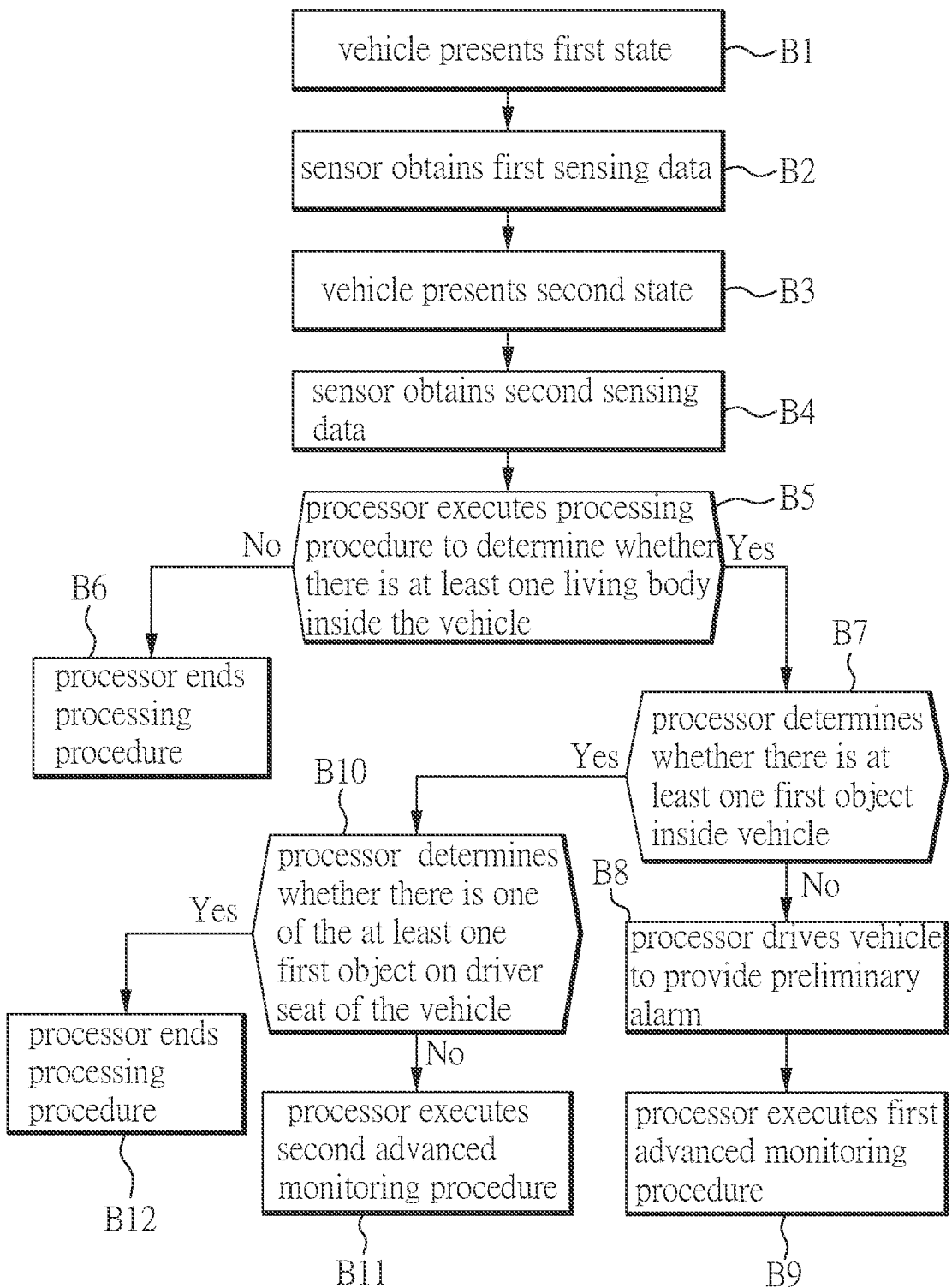
FIG. 5 is an operation flow chart of the detection system according to the second embodiment of the present disclosure.

Next, different implementation aspects of the operation flow of the detection system 1 will be described. FIG. 5 is an operation flow chart of the detection system 1 according to the second embodiment of the present disclosure, and please refer to FIGS. 1 to 4 at the same time.

As shown in FIG. 5, step B1 is executed first, in which the vehicle 100 presents the first state. Then, step B2 is executed, and the sensor 10 obtains the first sensing data. Then, step B3 is executed, in which the vehicle 100 presents the second state. Then, step B4 is executed, in which the sensor 10 obtains the second sensing data. Then, step B5 is executed, in which the processor 20 executes a processing procedure to determine whether there is at least one detection target inside the vehicle 100. When the processor 20 determines that there is no at least one detection target inside the vehicle 100, step B6 is executed, in which the processor 20 ends the processing procedure. When the processor 20 determines that there is at least one detection target inside the vehicle 100, step B7 is executed, in which the processor 20 determines whether there is at least one first object inside the vehicle 100. When the processor 20 determines that there is no at least one first object inside the vehicle 100, step B8 is executed, in which the processor 20 drives the vehicle 100 to provide a preliminary alarm. Then, step B9 is executed, in which the processor 20 executes the first advanced monitoring procedure. When the processor 20 determines that there is at least one first object inside the vehicle 100, step B10 is executed, in which the processor 20 determines whether there is one of the at least one first object on the driver seat 103 (shown in FIGS. 2A-2E) of the vehicle 100. When the processor 20 determines that there is no one of the at least one first object on the driver seat 103, step B11 is executed, in which the processor 20 executes a second advanced monitoring procedure. When the processor 20 determines that there is one of the at least one first object at the driver seat 103, step B12 is executed, in which the processor 20 ends the processing procedure.

Regarding steps B1 to B9, the description of steps A1 to A9 (as shown in FIG. 3) may be applied thereto, and thus a detailed description is deemed unnecessary.

Regarding step B10, when there is no adult on the driver seat 103, it indicates that the driver is not inside the vehicle 100. Since there is no driver in the vehicle 100, the possibility of encountering dangerous events is higher than there being a driver in the vehicle 100, and thus step B11 is executed, in which the processor 20 may perform the second advanced monitoring procedure. In one embodiment, there may be a waiting time between steps B10 and B11. For example, step B11 will only be executed when the time elapsed after the driver leaves the driver seat 103 exceeds the waiting time, but it is not limited thereto. In addition, the details about the second advanced monitoring procedure will be explained in subsequent paragraphs with reference to FIG. 6.

Regarding step B12, when there is an adult on the driver seat 103, it usually indicates that the driver is sitting in the driver seat 103 and, at this moment, the vehicle 100 may be ready to start or in a standby state, so that the possibility of encountering dangerous events is low.

Figure 6:
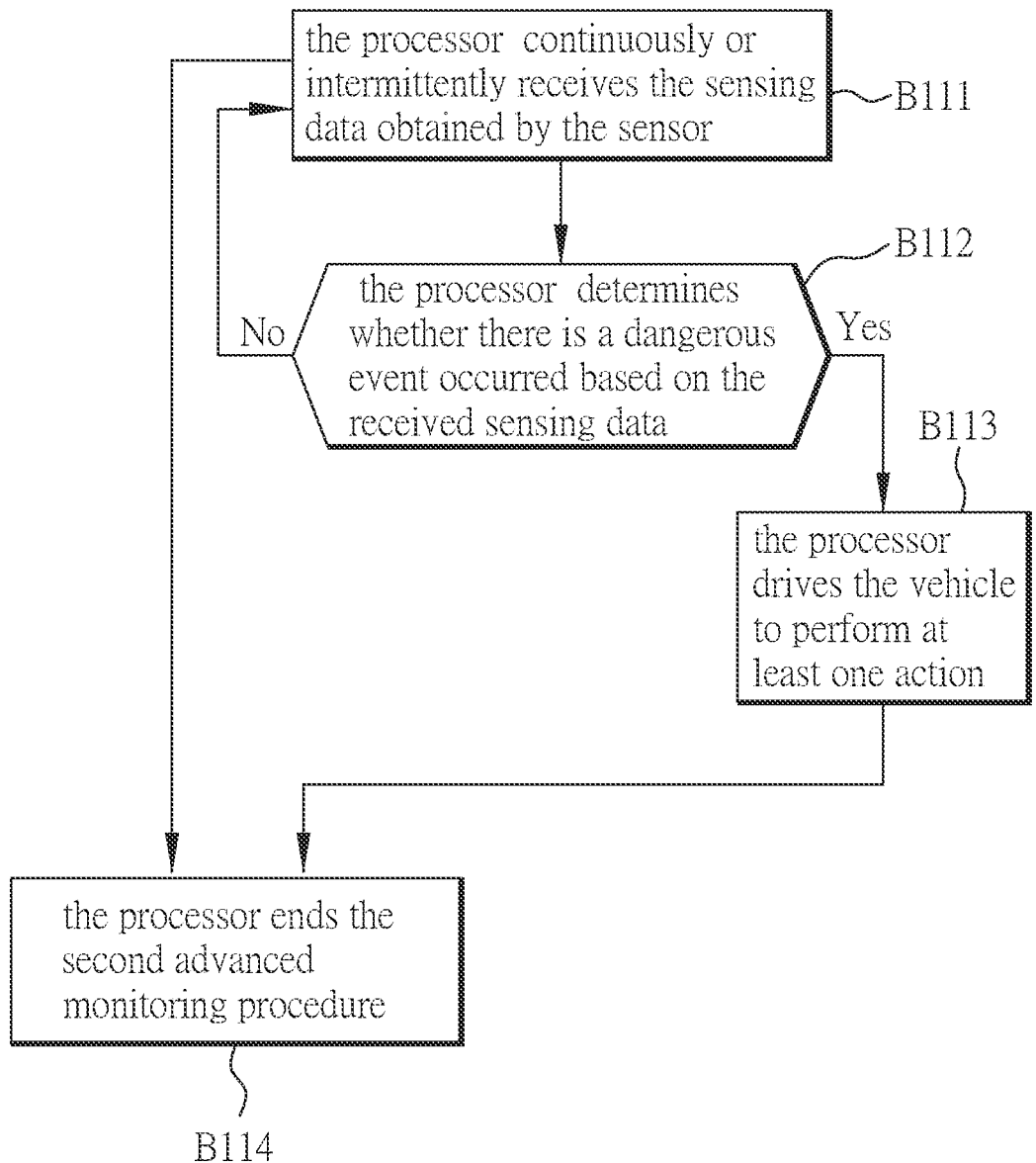
FIG. 6 is a flow chart illustrating the steps of the second advanced monitoring procedure according to an embodiment of the present disclosure.

Next, the details of the second advanced monitoring procedure (step B11) will be described. FIG. 6 is a flow chart illustrating the steps of the second advanced monitoring procedure according to an embodiment of the present disclosure, and please refer to FIGS. 1 to 5 at the same time.

As shown in FIG. 6, first step B111 is executed, in which the processor 20 continuously or intermittently receives the sensing data obtained by the sensor 10. Then, step B112 is executed, in which the processor 20 determines whether there is a dangerous event occurred based on the received sensing data. When the processor 20 determines that there is no dangerous event occurred, steps B111 and B112 are re-executed. When the processor 20 determines that there is a dangerous event occurred, step B113 is executed, in which the processor 20 drives the vehicle 100 to perform at least one action. During the process of the second advanced monitoring procedure, when the vehicle 100 presents a third state (for example, when the engine of the vehicle 100 is started), step B114 is executed, in which the processor 20 ends the second advanced monitoring procedure.

Regarding steps B111 to B113, the description of steps A101 to A103 (as shown in FIG. 4) may be applied thereto, and thus a detailed description is deemed unnecessary.

Regarding step B114, during the process of the second advanced monitoring procedure, when the engine of the vehicle 100 is started, it indicates that the driver has returned to the vehicle 100 and the vehicle 100 is ready to move. Therefore, the possibility of encountering dangerous events has been reduced, so that the second advanced monitoring procedure may be terminated, and the detection system 1 may temporarily stop operating, while it is not limited thereto.

As a result, the operation flow of the detection system 1 and the second advanced monitoring procedure of the second embodiment can be understood.

Figure 7:
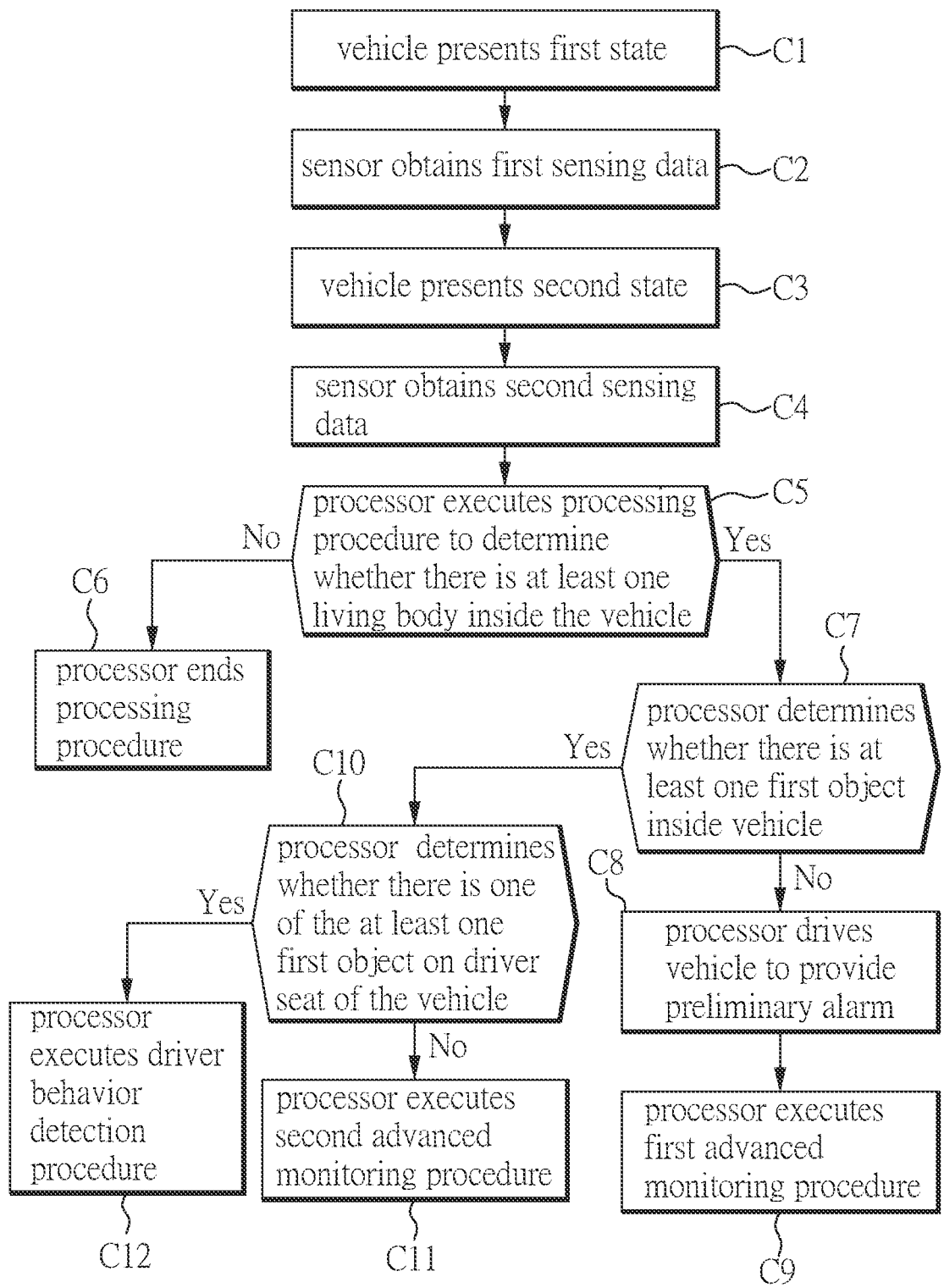
FIG. 7 is an operation flow chart of the detection system according to the third embodiment of the present disclosure.

Next, different implementation aspects of the operation flow of the detection system 1 will be described. FIG. 7 is an operation flow chart of the detection system 1 according to the third embodiment of the present disclosure, and please refer to FIGS. 1 to 6 at the same time.

As shown in FIG. 7, step C1 is executed first, in which the vehicle 100 presents the first state. Then, step C2 is executed, in which the sensor 10 obtains the first sensing data. Then, step C3 is executed, in which the vehicle 100 presents the second state. Then, step C4 is executed, in which the sensor 10 obtains second sensing data. Then, step C5 is executed, in which the processor 20 executes a processing procedure to determine whether there is at least one detection target inside the vehicle 100. When the processor 20 determines that there is no at least one detection target inside the vehicle 100, step C6 is executed, in which the processor 20 ends the processing procedure. When the processor 20 determines that there is at least one detection target inside the vehicle 100, step C7 is executed, in which the processor 20 determines whether there is at least one first object inside the vehicle 100. When the processor 20 determines that there is no at least one first object inside the vehicle 100, step C8 is executed, in which the processor 20 drives the vehicle 100 to provide a preliminary alarm. Then, step C9 is executed, in which the processor 20 executes the first advanced monitoring procedure. When the processor 20 determines that there is at least one first object inside the vehicle 100, step C10 is executed, in which the processor 20 determines whether there is one of the at least one first object on the driver seat 103 (shown in FIGS. 2A-2E) of the vehicle 100. When the processor 20 determines that there is no one of the at least one first object on the driver seat 103, step C11 is executed, in which the processor 20 executes the second advanced monitoring procedure. When the processor 20 determines that there is one of the at least one first object on the driver seat 103, step C12 is executed, in which the processor 20 executes a driver behavior detection procedure.

The description of steps B1 to B11 (as shown in FIG. 5) may be applied to that of steps C1 to C11, and thus a detailed description is deemed unnecessary.

Regarding step C12, when the driver is on the driver seat 103, the driver may be resting, but may also be unconscious, and thus the driver behavior detection procedure may be executed.

Figure 8:
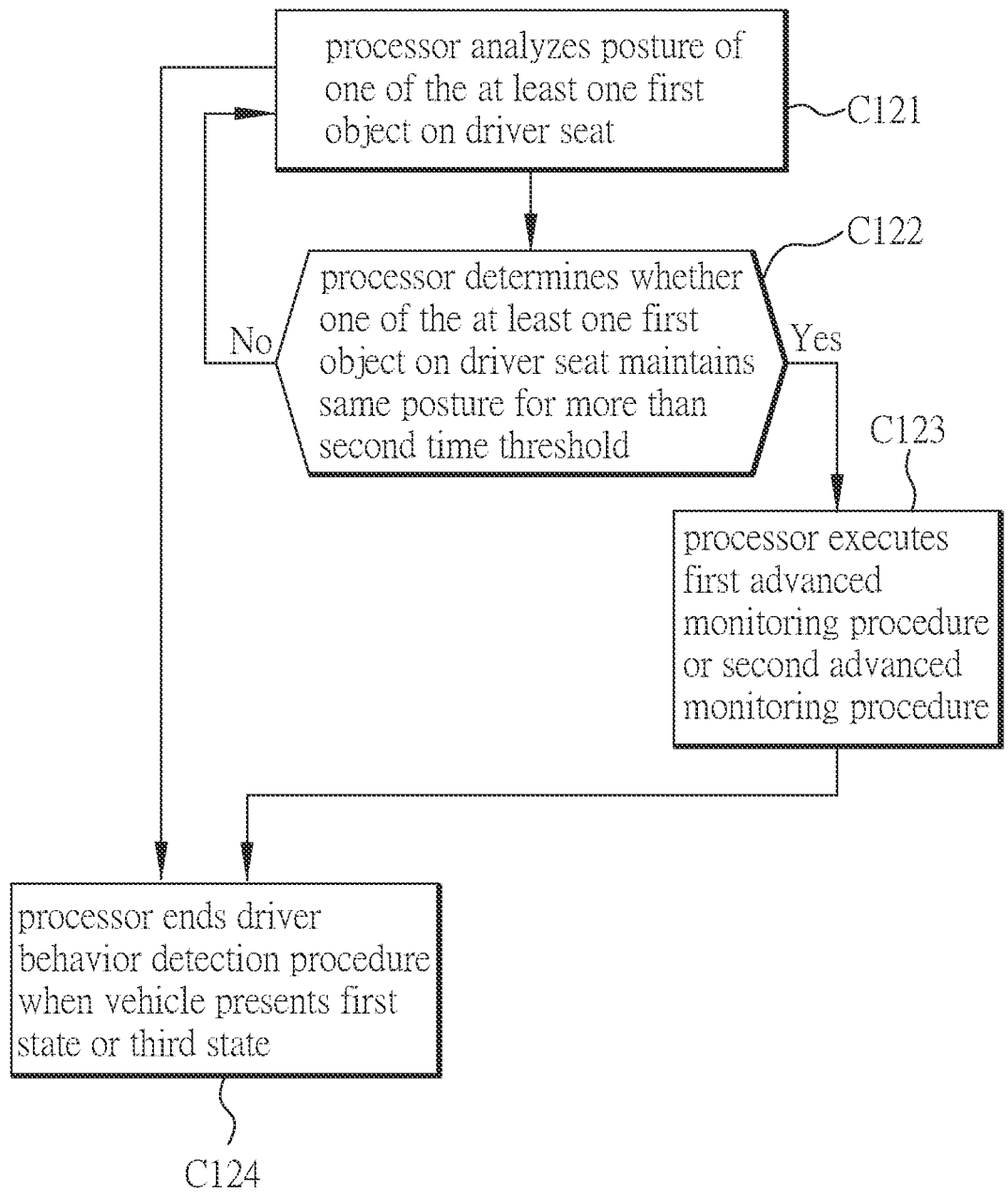
FIG. 8 is a flow chart illustrating the steps of the driver behavior detection procedure according to an embodiment of the present disclosure.

Next, the details of the driver behavior detection procedure (step C12) will be described. FIG. 8 is a flow chart illustrating the steps of the driver behavior detection procedure according to an embodiment of the present disclosure, and please refer to FIGS. 1 to 7 at the same time.

As shown in FIG. 8, step C121 is executed first, in which the processor 20 analyzes the posture of one of the at least one first object (for example, driver) on the driver seat 103. Then, step C122 is executed, in which the processor 20 determines whether one of the at least one first object on the driver seat 103 maintains the same posture for more than a second time threshold. When one of the at least one first object on the driver seat 103 maintains the same posture for more than a second time threshold, step C123 is executed, in which the processor 20 executes the first advanced monitoring procedure or the second advanced monitoring procedure. When one of the at least one first object on the driver seat 103 maintains the same posture for less than the second time threshold, steps C121 and C122 are re-executed. During the process of the driver behavior detection procedure, when the vehicle 100 presents the first state or the third state, step C124 is executed to end the driver behavior detection procedure.

Regarding step C121, in one embodiment, the sensor 10 may continuously or intermittently obtain the sensing data at the driver seat 103, and the processor 20 may continuously or intermittently determine the posture of the driver on the driver seat 103 based on the sensing data.

Regarding steps C122 and C123, since the driver maintains the same posture for more than the second time threshold, it indicates that the driver may fall asleep or lose consciousness, which may increase the possibility of encountering dangerous events, so that it is required to further monitor the internal status of the vehicle, and thus step C123 may be executed. On the contrary, if the posture of the driver changes, it indicates that the possibility of the driver staying awake is high, so that the processor 20 may continue to execute steps C121 and C122. In one embodiment, the second time threshold may be between 10 minutes and 20 minutes (10 minutes≤second time threshold≤20 minutes), while it is not limited thereto. In one embodiment, the second time threshold may be between 15 minutes and 30 minutes (15 minutes≤second time threshold≤30 minutes), while it is not limited thereto.

Regarding step C124, in one embodiment, when the door of the vehicle 100 is opened (the first state), it indicates that someone may find the situation inside the car and the driver situation, and thus the driver behavior detection procedure may be ended, and the detection system 1 may also temporarily stop operating. In one embodiment, when the engine of the vehicle 100 is started, it indicates that the driver will start to control the vehicle 100, so that the driver behavior detection procedure may be ended, and the detection system 1 may also temporarily stop operating.

As a result, the operation flow of the detection system 1 and the driver behavior detection procedure of the third embodiment can be understood.

In one embodiment, with the present disclosure, it may at least determine whether a product in contention falls within the protection scope of the present disclosure by the operating mode of the product in contention, or by using the algorithm of the product in contention, while it is not limited thereto. In one embodiment, the algorithm of the product in contention may be obtained, for example, through reverse engineering, while it is not limited thereto.

The details or features of the various embodiments of the present disclosure may be mixed and matched as long as they do not violate the spirit of the disclosure or conflict with each other.

Accordingly, the detection system 1 of the present disclosure may detect whether there is a trapped person inside the vehicle 100. Alternatively, the detection system 1 of the present disclosure may drive the vehicle 100 to perform at least one action in a timely manner to assist the trapped person in seeking help. Alternatively, the detection performed by the detection system 1 of the present disclosure may eliminate most of the normal use situations, and may improve the accuracy in determining whether there is a dangerous event occurred or not.

The aforementioned specific embodiments should be interpreted as merely illustrative, and not limiting the rest of the present disclosure in any way.

The invention claimed is:

1. A detection system, comprising:
at least one sensor disposed inside a vehicle, wherein the at least one sensor obtains a first sensing data when the vehicle presents a first state, and the at least one sensor obtains a second sensing data when the vehicle presents a second state; and
a processor executing a processing procedure according to at least one instruction, wherein the processing procedure includes the steps of:
obtaining the first sensing data and the second sensing data;
comparing the first sensing data and the second sensing data; and
determining whether there is at least one detection target inside the vehicle according to a comparison result of the first sensing data and the second sensing data;
when there is the at least one detection target inside the mobile vehicle, determining whether there is a first object inside the vehicle, wherein type of the first object comprises an adult;
when there is no first object in the vehicle, executing a first advanced monitoring procedure; and when there is the first object in the vehicle, ending the processing procedure.

2. The detection system as claimed in claim 1, wherein the first advanced monitoring procedure includes the steps of:
receiving sensing data obtained by the at least one sensor;
determining whether there is a dangerous event occurred based on the received sensing data;
when there is a dangerous event occurred, driving the vehicle to perform an action; and
when the vehicle presents the first state, ending the first advanced monitoring procedure.

3. The detection system as claimed in claim 2, wherein the dangerous event includes:
violent movement of the at least one detection target, abnormal temperature or body temperature of the at least one detection target, abnormal ambient temperature inside the vehicle, or the at least one detection target being determined to be a second object and time of all first objects leaving the vehicle exceeding a first time threshold, or a combination thereof.

4. The detection system as claimed in claim 2, wherein the action includes: continuously monitoring situation in the vehicle, issuing an alarm, automatic control, or asking for external help, or a combination thereof.

5. The detection system as claimed in claim 1, wherein the processing procedure further includes the steps of:
when there is the at least one detection target inside the vehicle, determining whether there is at least one first object inside the vehicle;
when there is no the at least one detection target inside the vehicle, executing a first advanced monitoring procedure;
when there is the at least one first object in the vehicle, determining whether there is one of the at least one first object on a driver seat of the vehicle; and
when there is no one of the at least one first object on the driver seat, executing a second advanced monitoring procedure; and
when there is one of the at least one first object on the driver seat, ending the processing procedure or executing a driver behavior detection procedure.

6. The detection system as claimed in claim 5, wherein the second advanced monitoring procedure includes the steps of:
receiving sensing data obtained by the at least one sensor;
determining whether there is a dangerous event occurred according to the received sensing data;
when there is a dangerous event occurred, driving the vehicle to perform at least one action; and
when the vehicle presents a third state, ending the second advanced monitoring procedure.

7. The detection system as claimed in claim 5, wherein the driver behavior detection procedure includes the steps of:
analyzing a posture of the one of the at least one first object;
when one of the at least one first object maintains the same posture for more than a second time threshold, executing the first advanced monitoring procedure or a second advanced monitoring procedure; and
when the vehicle presents the first state or a third state, ending the driver behavior detection procedure.

8. The detection system as claimed in claim 1, wherein the first state includes performing operation on an operable component of the vehicle, and the second state includes ending the operation of the operable component of the vehicle.

9. The detection system as claimed in claim 1, wherein the at least one sensor includes an infrared sensor, a visible light sensor, an optical sensor or a temperature sensor, or a combination thereof.

10. The detection system as claimed in claim 1, wherein the mobile vehicle is a car, and the processor is installed in a vehicle-mounted host of the vehicle or in a cloud server.

11. The detection system as claimed in claim 10, wherein the at least one instruction is stored in a non-transitory computer-readable medium, and the non-transitory computer-readable medium is disposed in the vehicle-mounted host of the vehicle, or in a memory or hard disk of the cloud server.

12. The detection system as claimed claim 10, wherein the at least one sensor is disposed on a roof of the vehicle, and the at least one sensor has a sensing range including an area of a seat of the vehicle.

13. The detection system as claimed in claim 10, wherein the at least one sensor is disposed near windows of the mobile vehicle, and the at least one sensor has a sensing range including an area of a seat of the vehicle.

14. The detection system as claimed in claim 10, wherein the at least one sensor is disposed on a seat, a center console, or the seat and the center console of the vehicle, wherein a sensing direction of a portion of the at least one sensor is directed to a driver seat, a passenger seat, or the driver seat and the passenger seat, and a sensing direction of another portion of the at least one sensor is directed to a rear seat area.

15. The detection system as claimed in claim 10, wherein at least one display device is disposed inside the vehicle, the at least one sensor is integrated with the at least one display device, a sensing direction of a portion of the at least one sensor is directed to a driver seat, a passenger seat, or the driver seat and the passenger seat, and a sensing direction of another portion of the at least one sensor is directed to a rear seat area.

16. The detection system as claimed in claim 10, wherein the at least one sensor is integrated with a window of the vehicle, and a sensing range of the at least one sensor includes an area of a seat of the vehicle.

17. The detection system as claimed in claim 8, wherein the vehicle is a car, the first state includes a state in which a door of the car is opened, a window of the car is opened, or lights of the car are turned on, and the second state includes a state in which a door of the car is closed, a window of the car is closed, or lights of the car are turned off.

18. The detection system as claimed in claim 6, wherein the vehicle is a car, the first state includes a state in which a door of the car is opened, a window of the car is opened, or lights of the car are turned on, the second state includes a state in which a door of the car is closed, a window of the car is closed, or lights of the car are turned off, and the third state in which an engine of the car is started.

19. The detection system as claimed in claim 2, wherein the processor determines whether there is a dangerous event occurred every time an interval passes, and the interval is between 0 seconds and 5 minutes.

* * * * *